(12) United States Patent
Cosentino

(10) Patent No.: US 12,509,004 B1
(45) Date of Patent: Dec. 30, 2025

(54) HYBRID BODY SIDE MOLDING FOR VEHICLES

(71) Applicant: Chris Cosentino, Caledon (CA)

(72) Inventor: Chris Cosentino, Caledon (CA)

(*) Notice: Subject to any disclaimer, the term of this patent is extended or adjusted under 35 U.S.C. 154(b) by 875 days.

(21) Appl. No.: 17/739,939

(22) Filed: May 9, 2022

(51) Int. Cl.
*B60R 13/04* (2006.01)
*B32B 3/04* (2006.01)
*B32B 5/18* (2006.01)
*B32B 15/095* (2006.01)
*B32B 15/20* (2006.01)

(52) U.S. Cl.
CPC ............... *B60R 13/04* (2013.01); *B32B 3/04* (2013.01); *B32B 5/18* (2013.01); *B32B 15/095* (2013.01); *B32B 15/20* (2013.01); *B32B 2255/26* (2013.01); *B32B 2605/08* (2013.01)

(58) Field of Classification Search
CPC ........... B32B 3/04; B32B 5/18; B32B 15/095; B32B 15/20; B32B 27/40; B32B 2255/26; B32B 2605/08; B60R 13/04
USPC .............. 428/31, 423.1; 296/146.7; 52/716.5
See application file for complete search history.

(56) References Cited

U.S. PATENT DOCUMENTS

| | | | | |
|---|---|---|---|---|
| 4,877,657 A | * | 10/1989 | Yaver | B60R 13/04 428/912.2 |
| 5,456,786 A | * | 10/1995 | Cook | B29C 48/12 156/244.11 |
| 5,786,047 A | | 7/1998 | Tomblin | |
| 6,422,571 B1 | | 7/2002 | Keeney et al. | |

* cited by examiner

*Primary Examiner* — Catherine A. Simone
(74) *Attorney, Agent, or Firm* — Sanchelima & Associates, P.A.; Jesus Sanchelima; Christian Sanchelima

(57) ABSTRACT

A hybrid body side molding for vehicles including a formed metal layer, a bottom layer, and a top layer. The formed metal layer includes a tape layer, a filling layer, a metal layer, and a polyurethane layer. The metal layer is backfilled with the filling layer. The filling layer is made of resin or foam. The metal layer is deposited over the tape layer. The decorative layer is screen printed on the metal layer. The polyurethane layer is deposited over said decorative layer. The metal layer is high polished aluminum. The tape is used to mount the formed metal layer to the side of a car. The hybrid body side molding for vehicles has a hybrid inside configuration, a hybrid outside configuration and a hybrid outside-inside configuration to add a top layer and a bottom layer. The top layer and the bottom layer are built in carbon fiber or print media.

10 Claims, 3 Drawing Sheets

SECTION A-A

HYBRID BODY SIDE MOLDING FOR VEHICLES

II. BACKGROUND OF THE INVENTION

1. Field of the Invention

The present invention relates to a hybrid body side molding for vehicles and, more particularly, to a hybrid body side molding for vehicles highly polished to give a chrome like appearance that protects the sides of a car.

2. Description of the Related Art

Several designs for hybrid body side molding for vehicles have been designed in the past. None of them, however, include additional modular layers to provide additional protection to the side molding.

Applicant believes that a related reference corresponds to U.S. Pat. No. 5,786,047 issued for a trim member for a vehicle body which may be formed from aluminum. Applicant believes that another related reference corresponds to U.S. Pat. No. 6,422,571 issued for a weather strip seal and decorative for an automotive vehicle. None of these references, however, teach of an automotive side molding assembly which is comprised of a strip of metal which is shaper to create a decorative trim piece on an automotive vehicle which produces a chrome-like effect and may include additional protecting layers to protect and provide further decorative effects.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a hybrid body side molding for vehicles that includes high polished aluminum to simulate a chrome finish.

It is another object of this invention to provide a hybrid body side molding for vehicles that includes additional modular layers to add protection to said polished aluminum.

It is still another object of the present invention to provide a hybrid body side molding for vehicles in different colors, the different colors are printed or using paint films on the side molding and can be built with real carbon fiber overlay.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

Figure 1:
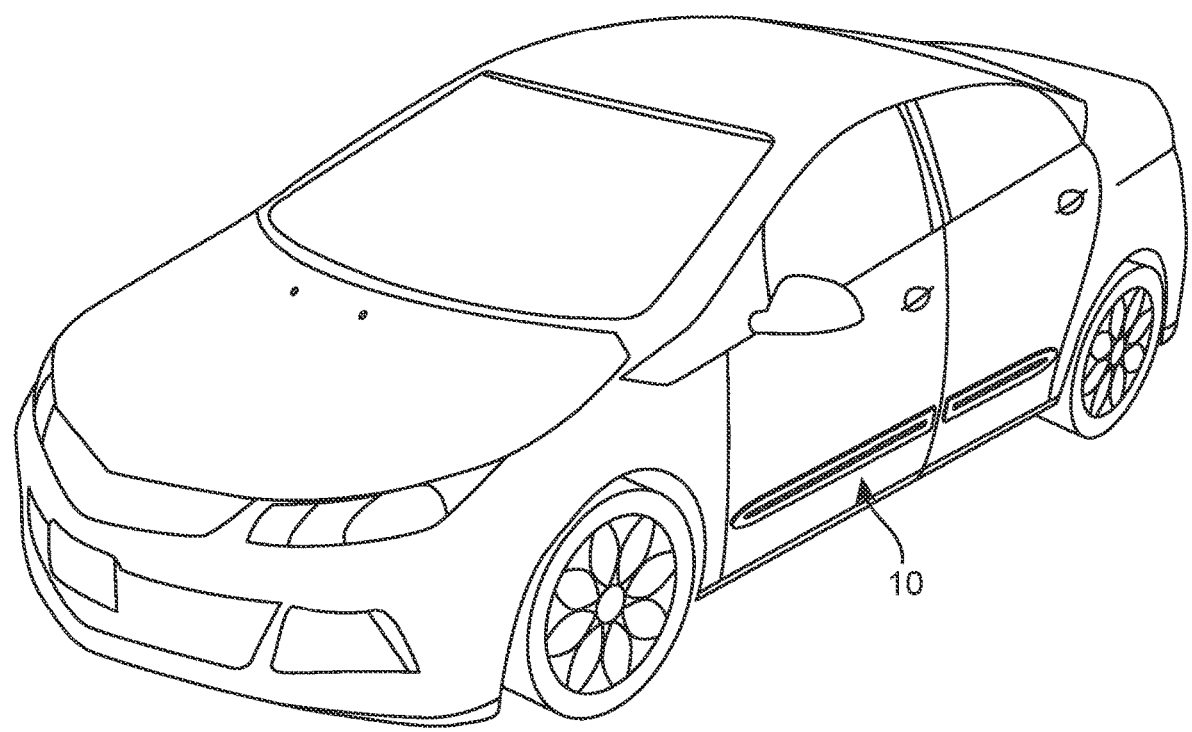
FIG. 1 represents an isometric operation view of the present invention 10 attached to the sides of a vehicle.
Figure 2:
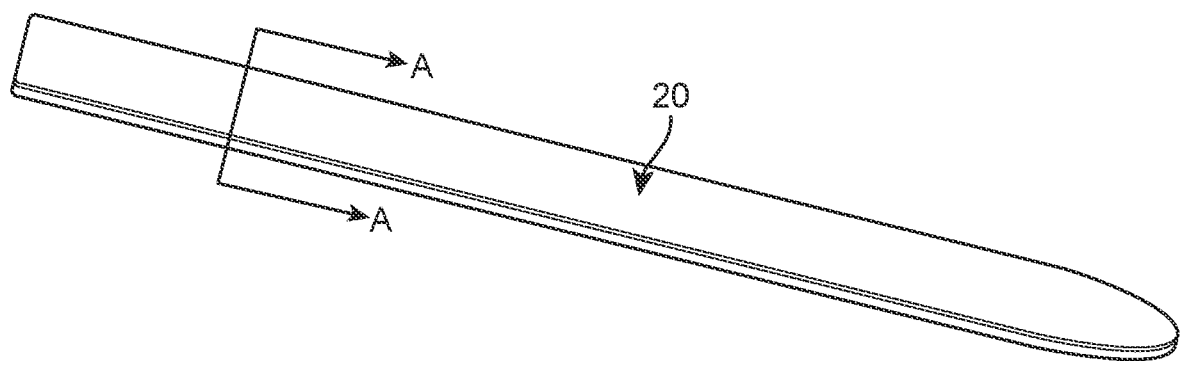
FIG. 2 shows an isometric view of the formed metal layer 20.
Figure 3:
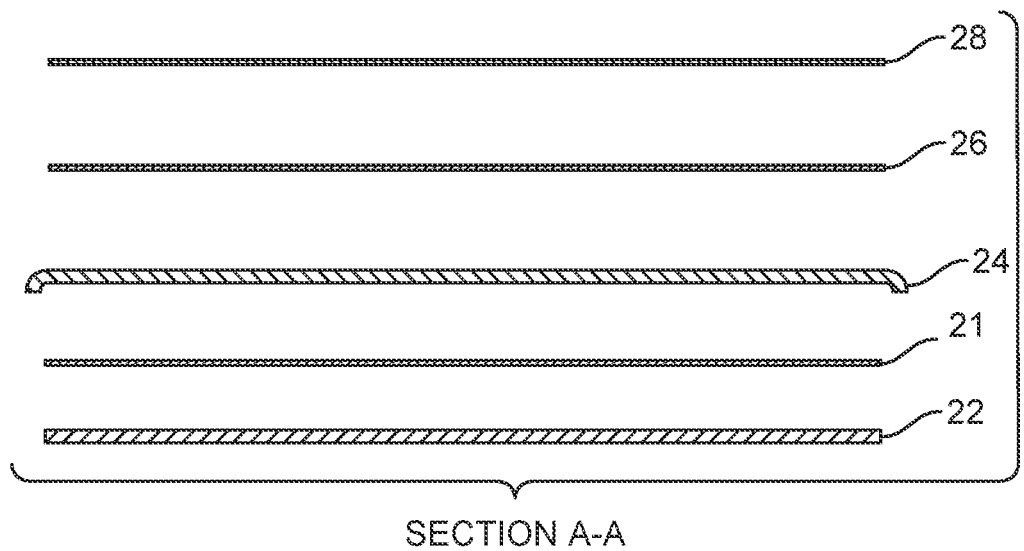

FIG. 3 illustrates an exploded section view in the direction A-A on FIG. 2 of the formed metal layer 20. The formed metal layer 20 includes a filling layer 21, a tape layer 22, metal 24, a decorative layer 26 and a polyurethane layer 28.

Figure 4:
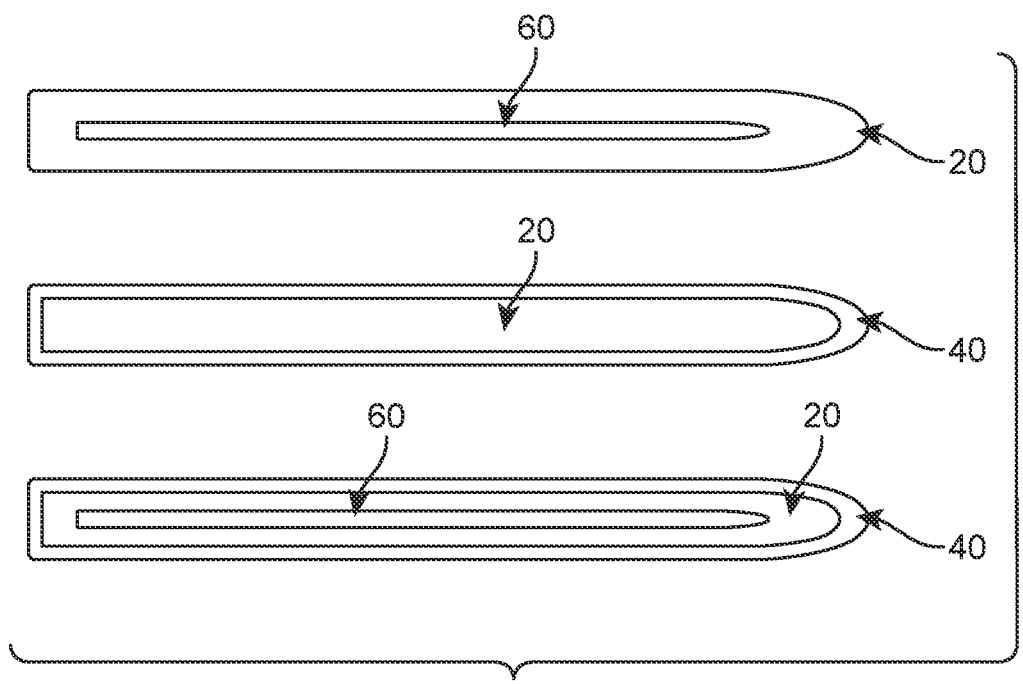

FIG. 4 is a representation of a front view of different embodiments of the present invention 10. The embodiments may include the formed metal layer 20 on its own or having a bottom layer 40, and a top layer 60 or a combination of both.

Figure 5:
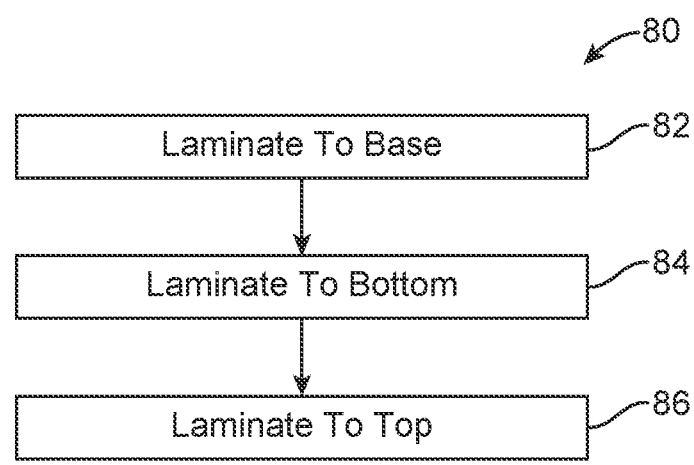

FIG. 5 shows a flow chart 80 for the addition of the top layer 60 and the bottom layer 40 to the formed metal layer 20.

V. DETAILED DESCRIPTION OF THE EMBODIMENTS OF THE INVENTION

Referring now to the drawings, where the present invention is generally referred to with numeral 10, it can be observed that it basically includes a formed metal layer 20, a bottom layer 40 and a top layer 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The formed metal layer 20 may include a tape layer 22, metal 24, a decorative layer 26 and a polyurethane layer 28 as shown in FIG. 3. The formed metal layer 20 may have a first distal end and a second distal end. The formed metal layer 20 may have a substantially rectangular shape. The first distal end of the formed metal layer 20 may be semi-circular. The second distal end of the formed metal layer 20 may have a rectangular shape. It also may be suitable for the formed metal layer 20 to have a triangular shape, a circular shape, or any other suitable shape. It may be suitable for the formed metal layer 20 to have rounded edges. It also may be suitable for the metal layer 20 to include additional layers to provide support or protection to the formed metal layer 20. It may be suitable for the formed metal layer 20 to have an anti rust layer.

In a preferred embodiment the metal 24 may be backfilled for the filling layer 21. The filling layer 21 may fill a bottom portion of the metal 24. The bottommost end of the metal 24 and the filling layer 21 may be deposited over the tape layer 22. The metal 24 and the filling layer 21 may fully cover the tape layer 22. In a preferred embodiment the filling layer 21 may be resin or foam. It also may be suitable for the filling layer 21 to be made of any material that provides internal resistance to the metal 24. In a preferred embodiment the decorative layer 26 may be deposited over the metal 24. In a preferred embodiment the polyurethane layer 28 may be deposited over the decorative layer 26. In a preferred embodiment the tape layer 22 may have a thickness of 0.75 mm. In a preferred embodiment the metal 24 may have a thickness of 0.5 mm. In a preferred embodiment the decorative layer 26 and the polyurethane layer 28 may have a thickness of 5 microns. It also may be suitable for the tape layer 22, the metal 24, the decorative layer 26 and the polyurethane layer 28 to have any other thickness. The decorative layer 26 may be screen or digitally printed on the metal 24. It also may be suitable for the decorative layer 26 to be made of carbon fiber. The decorative layer 26 may be screen or digitally printed in different colors and shapes.

The metal 24 may be aluminum. The metal 24 may have a high polished finish to simulate a chrome finish. It may be suitable for the metal 24 to be made of any other suitable resistant metal such as copper, brass, or steel. The decorative layer 26 may be deposited over the metal 24 to protect the high polished finish. The polyurethane layer 28 may be deposited to protect the high polished finish. In a preferred embodiment the formed metal layer 20 may be fixed to a car through the tape layer 22. The tape layer 22 may be located on a bottommost end of the formed metal layer 20. The bottommost end of the formed metal layer 20 may be planar. The formed metal layer 20 may protect a car from crashes with other cars. The formed metal layer 20 may also be used as a decorative ornament for a car.

Referring now to FIG. 4 the formed metal layer 20 may have a hybrid inside configuration having the top layer 60 over the formed metal layer 20; a hybrid outside configuration having and the bottom layer under the formed metal layer 20; and a hybrid inside-outside configuration having the top layer 60 over the formed metal layer 20 and the bottom layer under the formed metal layer 20. The top layer 60 and the bottom layer 40 may be substantially made of carbon fiber or printed media. The top layer 60 and the bottom layer 40 may include a polyurethane coating and an ABS substrate. ABS stands for Acrylonitrile Butadiene Styrene which is known in the prior art as a thermoplastic polymer moldable above a specified temperature. The formed metal layer 20, the top layer 60 and the bottom layer may be fixed together by double sided tape.

Referring now to the FIG. 5 the hybrid outside inside configuration may be fixed together following the method 80. The method 80 includes a first step 82, a second step 84 and a third step 86. The first step 82 refers to laminate to base. The first step 82 may be laminate to base with ABS substrate the formed metal layer 20. The first step 82 may form a base wherein the carbon fiber or the print media may be added. The carbon fiber may be added in the second step 84. The second step 84 may be laminate to bottom the carbon fiber or the print media and laminate of ABS substrate. The first step 82 and the second step 84 may be performed together to add the bottom layer 40 to the formed metal layer. Between the first step 82 and the second step 84 carbon fiber or print media may be added. To add the carbon fiber the process is: cut the carbon fiber to tile, freeze, laminate to base, cut the carbon fiber to geometry, and add polyurethane coating. To add the print media between the first step 82 and the second step 84 the process is: cut print media to geometry and add polyurethane coating.

The third step 86 refers to laminate to top the carbon fiber or the print media and laminate of ABS substrate. The third step 86 may be performed together with the first step 82 to attach the top layer 40 to the top of the formed metal layer 20 to have the invention 10 in a hybrid inside configuration. To perform the third step 86 the process for laminate to top the carbon fiber is: cut carbon fiber to tile, freeze, laminate to base, cut carbon fiber to geometry and add polyurethane coating and laminate to top of ABS substrate. To perform the third step 86 the process for laminate to top the print media is: laminate to base, print, cut the print media to geometry, and add polyurethane coating. Carbon fibers are woven, or non-woven fabric known in the prior art composed mostly of carbon atoms about 5 to 10 micrometers in diameter. It also may be suitable for the top layer 60 and the bottom layer 40 to be built in other woven fabrics such as Aramid/Carbon, Aramid/Glass, Carbon/Glass, or the like.

Addition of the top layer 60 and addition of the bottom layer 40 to the formed metal layer 20 add protection to the present invention 10. It also may be suitable to add carbon fiber to cover the formed metal layer 20. It also may be suitable to add print media to cover the formed metal layer 20. The formed metal layer 20, the bottom layer 40 and the top layer 60 may be used as decorative ornamental molding for a car. The present invention may have a hybrid outside configuration including the bottom layer 40, a hybrid inside configuration including the top layer 60 and a hybrid inside-outside configuration including the bottom layer 40 and the top layer 60.

The top layer 60 may be smaller in width and length than the formed metal layer 20. The top layer 60 may have a first distal end and a second distal end. The top layer 60 may have a substantially rectangular shape. The first distal end of the top layer 60 may be semicircular. The second distal end of the top layer 60 may have a rectangular shape. The base of the top layer 60 may be in abutting contact with the top of the formed metal layer 20. It also may be suitable for the top layer 60 to have a triangular shape, a circular shape, or any other suitable shape. It may be suitable for the top layer 60 to have rounded edges. It also may be suitable for the top layer 60 to include additional layers to provide support or protection to the formed metal layer 20. It may be suitable for top layer 60 to have an anti rust layer.

The bottom layer 40 may be larger in width and length than the formed metal layer 20. The bottom layer 40 may have a first distal end and a second distal end. The bottom layer 40 may have a substantially rectangular shape. The first distal end of the bottom layer 40 may be semicircular. The second distal end of the bottom layer 40 may have a rectangular shape. The uppermost end of the bottom layer 40 may be in abutting contact with the bottommost end of the formed metal layer 20. It also may be suitable for the bottom layer 40 to have a triangular shape, a circular shape, or any other suitable shape. It may be suitable for the bottom layer 40 to have rounded edges. It also may be suitable for the bottom layer 40 to include additional layers to provide support or protection to the formed metal layer 20. It may be suitable for bottom layer 40 to have an anti rust layer.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A hybrid body side molding for vehicles, comprising:
   a formed metal layer; wherein said formed metal layer includes a tape layer, a metal layer, a filling layer and a polyurethane layer, wherein said formed metal layer has ends, said formed metal layer has a rectangular elongated shape, one of the ends of said formed metal layer has a semicircular shape, said tape layer is configured to mount said formed metal layer to a side of a car, said metal layer is backfilled by means of said filling layer, said metal layer is deposited over said tape layer, said polyurethane layer is deposited over said metal layer, said metal layer has a high polished finish, said hybrid body side molding for vehicles has a hybrid inside configuration, a hybrid outside configuration and a hybrid outside-inside configuration:
   wherein said hybrid outside-inside configuration includes a bottom layer and a top layer in said hybrid outside-inside configuration an uppermost end of said bottom layer is attached to a bottommost end of said formed metal layer in said hybrid outside-inside configuration said bottommost end of said top layer is attached to an uppermost end of said formed metal layer; wherein a polyurethane coating covers said top layer and said bottom layer.

2. The hybrid body side molding for vehicles set forth in claim 1, wherein said metal layer is made of aluminum.

3. The hybrid body side molding for vehicles set forth in claim 1, wherein said hybrid inside configuration includes said top layer, in said hybrid inside configuration said bottommost end of said top layer is attached to said uppermost end of said formed metal layer.

4. The hybrid body side molding for vehicles set forth in claim 1, wherein said hybrid outside configuration includes said bottom layer, in said hybrid outside configuration said uppermost end of said bottom layer is attached to said bottommost end of said formed metal layer.

5. The hybrid body side molding for vehicles set forth in claim 1, wherein said top layer and said bottom layer are formed in carbon fiber or print media.

6. The hybrid body side molding for vehicles set forth in claim 1, wherein said top layer conforms to the shape of said formed metal layer, said top layer is smaller in width and length than said formed metal layer.

7. The hybrid body side molding for vehicles set forth in claim 1, wherein said bottom layer conforms to the shape of said formed metal layer, said bottom layer is greater in width and length than said formed metal layer.

8. The hybrid body side molding for vehicles set forth in claim 1, wherein said filling layer is foam or resin.

9. The hybrid body side molding for vehicles set forth in claim 1, wherein said formed metal layer includes a decorative layer, wherein said decorative layer is deposited over said metal layer, said decorative layer is a print film or carbon fiber.

10. An hybrid body side molding for vehicles, comprising:
a formed metal layer; wherein said formed metal layer includes a tape layer, a metal layer, a filling layer, a decorative layer and a polyurethane layer, wherein said formed metal layer has ends, said formed metal layer has a rectangular elongated shape, one of the ends of said formed metal layer has a semicircular shape, said metal layer is made of aluminum, said tape layer is configured to mount said formed metal layer to a side of a car, said metal layer is backfilled by means of said filling layer, said metal layer is deposited over said tape layer, said polyurethane layer is deposited over said decorative layer, said decorative layer is a print layer or a carbon fiber layer, said decorative layer is deposited on said metal layer, said metal layer has a high polished finish, said hybrid body side molding for vehicles has:
a hybrid inside configuration, wherein said hybrid inside configuration includes a top layer attached to an uppermost end of said formed metal layer, said top layer conforms to a shape of said formed metal layer, said top layer is smaller in width and length than said formed metal layer;
a hybrid outside configuration, wherein said hybrid outside configuration includes a bottom layer attached to a bottommost end of said formed metal layer, said bottom layer conforms to said shape of said formed metal layer, said bottom layer is greater in width and length than said formed metal layer;
and a hybrid outside-inside configuration, wherein said hybrid outside-inside configuration has said top layer attached to said uppermost end of said formed metal layer and said bottom layer attached to said bottommost end of said formed metal layer.

* * * * *